United States Patent Office 3,420,782
Patented Jan. 7, 1969

3,420,782
STORAGE STABLE FOAM STABILIZING AGENT FOR CELLULAR POLYURETHANE PLASTICS
Manfred Dahm, Leverkusen, and Walter Simmler, Cologne-Mulheim, Germany, assignors to Farbenfabriken Bayer Aktiengesellschaft, Leverkusen, Germany
No Drawing. Continuation-in-part of application Ser. No. 115,892, June 9, 1961. This application Apr. 22, 1966, Ser. No. 544,381
Claims priority, application Germany, June 10, 1960, F 31,407
U.S. Cl. 252—400                7 Claims
Int. Cl. B01j *1/16;* C08f *47/00*

ABSTRACT OF THE DISCLOSURE

A stable mixture of water, tertiary amine catalyst and a siloxane which contains direct carbon to silicon bonds as a composition which is storage stable and useful in the production of cellular polyurethane plastics.

---

This invention relates to the preparation of polyurethanes and, more particularly, to the preparation of cellular polyurethane plastics in the presence of a foam stabilizing agent. The application is a continuation-in-part of Ser. No. 115,892, filed June 9, 1961, and now abandoned.

In the production of cellular polyurethane plastics, it is sometimes necessary to use a foam stabilizing substance to prevent the boiling and consequent collapse of the cellular structure. Heretofore it has been proposed to use as foam stabilizers to prevent this boiling and collapse various silicone compounds which may or may not contain active hydrogen containing groups. The condensation products of dimethyl polysiloxanes with polyalkylene ether glycols which could be referred to as organo silicic acid esters have been proposed heretofore, but a disadvantage of using these products is that they can be mixed with only certain of the components which are used in the preparation of the cellular polyurethane plastics. Otherwise they become hydrolyzed and/or undergo other reactions which destroy their ability to stabilize the foaming reaction. It would appear that one could overcome this problem by using an excess of the silicic acid ester since only small amounts are used to begin with and the hydrolysis proceeds slowly so that only small amounts of the polymethyl polysiloxane which is formed in the hydrolysis are left in the reaction mixture. However, the difficulty is compounded by the fact that the by-product of the hydrolysis reaction poisons the other stabilizers that are present so that coarse irregular pores are formed in the cellular product. The polymethyl polysiloxanes would not ordinarily be suspected of producing this effect since they have proved to be very satisfactory foam stabilizers where the organic polyisocyanates are reacted in a first step with a polyhydric polyalkylene ether to produce an isocyanato terminated prepolymer.

The processing difficulties involved when the foam stabilizer must be separately mixed are manifold. For the purpose of accurately maintaining a quantitative ratio of water, catalyst and stabilizer, which is used in small amounts compared to other foaming ingredients, they should be premixed in the exact ratio required and then supplied to the rest of the reaction components, particularly where one of the machines for mixing the components of a cellular polyurethane is used. However, where this is done, the silicic acid ester is hydrolyzed and often poisons the balance of the mixture. It would be desirable to have a foam stabilizer as effective in producing a stabilized cellular structure having uniform cells as the heretofore known silicic acid esters, but which did not have to be mixed in a certain order to avoid poisoning of the stabilizing effect.

It is therefore, an object of this invention to provide a method of stabilizing the formation of cellular polyurethane plastics with a stabilizer which is stable during storage in the solution or emulsion used for the preparation of the cellular polyurethane plastic. Another object of this invention is to provide a foam stabilizer which is resistant to hydrolysis. Still a further object of this invention is to provide a foam stabilizer which is suitable for use in different components of the plastic in all proportions without deleterious effects. Still a further object of the invention is to provide a foam stabilizer which will regulate the pore size according to the quantity added without deterioration in the final properties of the cellular polyurethane plastic. Still another object of this invention is to provide a method of preparing cellular polyurethanes using the improved foam stabilizers of the invention and cellular polyurethane plastics obtained by said process.

The foregoing objects and others which will become apparent from the following description are accomplished in accordance with the invention, generally speaking, by providing an improved method of stabilizing the reaction leading to the production of a cellular polyurethane plastic which comprises carrying out said reaction in the presence of substituted methyl lower alkyl amines and/or ethers which contain siloxanyl radicals attached to the methyl groups. In other words, this invention contemplates the preparation of cellular polyurethane plastics from polyhydric polyalkylene ethers and organic polyisocyanates in the presence of a blowing agent and a stabilizer which is a substituted methyl lower alkyl amine and/or ether, the methyl groups of which each carry a siloxanyl radical.

These stabilizers can be represented by a general formula as known in silicone chemistry $$A_wB_xC_yD_z$$

The letters A, B, C and D denote building blocks which may be statistically arranged within the molecule. The meaning of the letters is as follows:

$$A = CH_3SiO_{3/2}$$

$$B = (CH_3)_2SiO_{2/2}$$

$$C = (CH_3)_3SiO_{1/2}$$

$$D = (CH_3)(R)(O_{1/2})Si—CH_2—Y—R''—Z$$

The indices $w$, $x$, $y$ and $z$ designate $w=0–10$; $x=1–150$; $y=0–10$; $z=1–5$.
Furthermore Z is $$NH_2, NHR', NR_2, NH—[R''NH]_p—H$$
$$NH—[R''O]_qH, NR'[R''NH]_p—H$$
$$NR—[R''O]_qH, OH, OR'$$
$$O—[R''O]_p—H \text{ and } O—[R''O]_qR', R''$$

is a lower alkylene radical having two to six carbon atoms, Y is —NH—, —NR′,

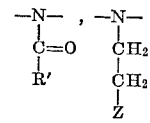

or O, R is $CH_3$ or $O_{1/2}$, R′ is alkyl or aryl, and $n$, $m$, $o$, $p$ and $q$ are integers and may be the same or different. Suitable alkylene radicals, R″, having from 2 to 6 carbon atoms are, for example, ethylene, propylene, isopropylene, butylene, isobutylene, pentylene, hexylene and the like divalent aliphatic radicals. Suitable alkyl and aryl radicals, R′, are, for example, preferably lower alkyl as methyl, ethyl, propyl, butyl, amyl, hexyl, heptyl and the like or monobenzene as phenyl, tolyl, xylyl and the like.

These stabilizers are preferably those having the formula

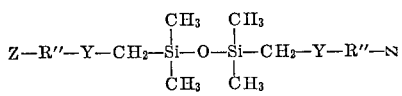

Another group of preferred stabilizers have the formula

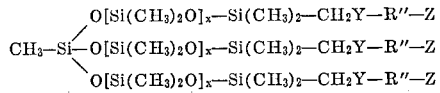

Any suitable substituted methyl lower alkyl amine and/or ether may be used including those which are amino functional or hydroxy functional such as, for example, (1) [HO—(CH$_2$)$_2$NH(CH$_2$)$_2$NHCH$_2$Si(CH$_3$)$_2$]$_2$O
(2) [(HOCH$_2$CH$_2$)$_2$NCH$_2$Si(CH$_3$)$_2$]$_2$O
(3) [Si(CH$_3$)$_2$O—]$_{20}$[CH$_3$SiO$_{3/2}$]—
   [O$_{1/2}$Si(CH$_3$)$_2$CH$_2$O(C$_2$H$_4$O)$_{17}$(C$_3$H$_6$O)$_{13}$C$_4$H$_9$]$_3$
(4) [Si(CH$_3$)$_2$O]$_{20}$[CH$_3$SiO$_{3/2}$]—
   [O$_{1/2}$Si(CH$_3$)$_2$CH$_2$NH(CH$_2$)$_2$NH(CH$_2$)$_2$NH$_2$—]$_3$

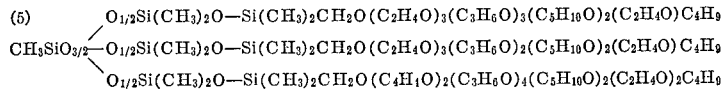

(6) C$_4$H$_9$O(C$_2$H$_4$O)$_{16}$(C$_3$H$_6$O)$_{13}$(C$_6$H$_{12}$O)—CH$_2$—
   Si(CH$_3$)$_2$O—[Si(CH$_3$)$_2$O]$_{10}$—OSi(CH$_3$)$_2$—CH$_2$—
   (OC$_6$H$_{12}$)(OC$_3$H$_6$)$_{13}$(OC$_2$H$_4$)$_{16}$OC$_4$H$_9$

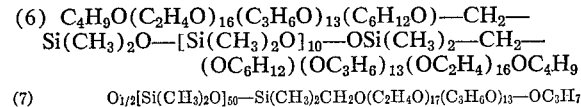

(8)
HO—CH$_2$CH$_2$CH$_2$—O—CH$_2$CH$_2$CH$_2$—O—CH$_2$—Si(CH$_3$)$_2$O—
[Si(CH$_3$)$_2$O]$_{10}$—OSi(CH$_3$)$_2$—CH$_2$—O—CH$_2$CH$_2$CH$_2$—O—CH—CH$_2$—OH
$\quad\quad\quad\quad\quad\quad\quad\quad\quad\quad\quad\quad\quad\quad\quad\quad\quad\quad\quad\quad\quad\quad\quad\quad\quad\quad\quad$ |
$\quad\quad\quad\quad\quad\quad\quad\quad\quad\quad\quad\quad\quad\quad\quad\quad\quad\quad\quad\quad\quad\quad\quad\quad\quad\quad\quad$ CH$_3$ (9)
HO—CH$_2$CH$_2$CH—O—CH$_2$CH$_2$CH$_2$CH$_2$—O—CH$_2$—Si(CH$_3$)$_2$O—
$\quad\quad\quad\quad\quad$ |
$\quad\quad\quad\quad\quad$ CH$_3$ $\quad\quad\quad\quad\quad\quad\quad\quad\quad\quad\quad\quad\quad\quad\quad\quad\quad\quad\quad\quad\quad\quad\quad$ CH$_3$
$\quad\quad\quad\quad\quad\quad\quad\quad\quad\quad\quad\quad\quad\quad\quad\quad\quad\quad\quad\quad\quad\quad\quad$ |
[Si(CH$_3$)$_2$O]$_{10}$—OSi(CH$_3$)$_2$—CH$_2$—O—CH—C—O—CH$_2$CH$_2$CH$_2$CH$_2$—OH
$\quad\quad\quad\quad\quad\quad\quad\quad\quad\quad\quad\quad\quad\quad\quad\quad\quad\quad\quad\quad\quad\quad\quad$ |
$\quad\quad\quad\quad\quad\quad\quad\quad\quad\quad\quad\quad\quad\quad\quad\quad\quad\quad\quad\quad\quad\quad\quad$ CH$_3$

(10) [CHSiO$_{3/2}$]$_3$[(CH$_3$)$_2$SiO]$_{70}$[O$_{1/2}$Si(CH$_3$)$_2$—
   CH$_2$O—(C$_2$H$_4$O)$_{17}$—(C$_3$H$_6$O)$_{13}$C$_4$H$_9$]$_5$
(11) [CH$_3$SiO$_{3/2}$]$_2$[(CH$_3$)$_2$SiO]$_{18}$[(CH$_3$)$_3$SiO$_{1/2}$]
   [O$_{1/2}$Si(CH$_3$)$_2$—CH$_2$O—(C$_2$H$_4$O)$_{17}$(C$_3$H$_6$O)$_{13}$C$_4$H$_9$]$_3$
(12) [(CH$_3$)$_3$SiO$_{1/2}$][(CH$_3$)$_2$SiO][O(CH$_3$)Si—CH$_2$—
   O—(C$_2$H$_4$O)$_{17}$—(C$_3$H$_6$O)$_{13}$C$_4$H$_9$]$_3$

(13)
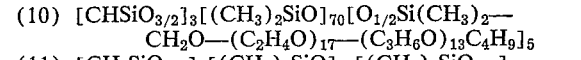

(14)
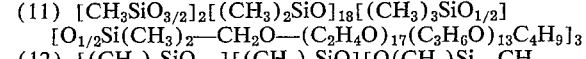

(15)
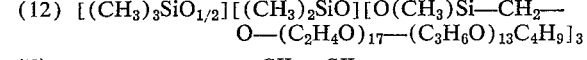

(16)
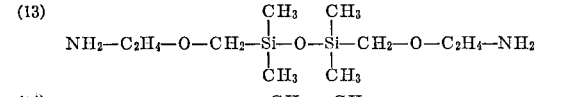

(17)
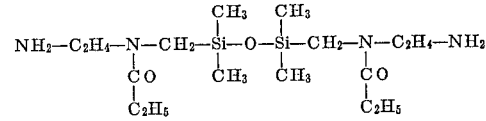

(18)
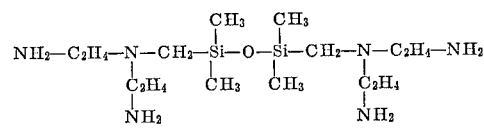

(19)
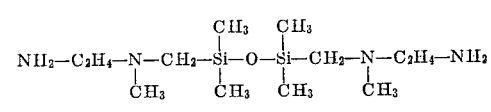

These silicone compounds can be added in varying quantities to the foamable reaction mixtures; depending on the reactivity thereof. It is usual to work with quantities from 0.05 percent to 5 percent by weight and preferably with quantities from 0.1 percent to 3 percent by weight based on the weight of the polyether.

Any suitable organic polyisocyanate may be used in the process of the present invention including aromatic, aliphatic and heterocyclic polyisocyanates. In other words, two or more isocyanato radicals may be bonded to any suitable divalent or higher polyvalent organic radical to produce the organic polyisocyanates which are useful in accordance with the present invention including acyclic, alicyclic, aromatic and heterocyclic radicals. Suitable organic polyisocyanates are, therefore, ethylene diisocyanate, ethylidene diisocyanate, propylene-1,2-diisocyanate, cyclohexylene-1,2-diisocyanate, m-phenylene diisocyanate, 2,4-toluylene diisocyanate, 2,6-toluylene diisocyanate, 3,3' - dimethyl - 4,4' - biphenylene diisocyanate, 3,3' - dimethyl - 4,4' - biphenylene diisocyanate, 3,3' - diphenyl-4,4'-biphenylene diisocyanate, 4,4'-biphenylene diisocyanate, 3,3'-dichloro-4,4'-biphenylene diisocyanate, p,p',p''-triphenylmethane triisocyanate, 1,5-naphthalene diisocyanate, furfurylidene diisocyanate or polyisocyanates in a blocked or inactive form such as the bis-phenyl carbamates of 2,4- or 2,6-toluylene diisocyanate, p,p',-diphenylmethane diisocyanate, p-phenylene diisocyanate, 1,5-naphthalene diisocyanate and the like. It is preferred to use the commercially available mixture of toluylene diisocyanates which contains 80 percent 2,4-toluylene diisocyanates and 20 percent 2,6-toluylene diisocyanate or 4,4'-diphenylmethane diisocyanate.

Any suitable polyhydric polyalkylene ether may be used but it is preferred to use polyhydric polyalkylene ethers which have a molecular weight of at least about 500 and preferably below about 10,000 so that satisfactory mixing of the polyhydric polyalkylene ether with the organic polyisocyanate is easily attained. The hydroxyl number of the polyhydric polyalkylene ether may vary preferably within the range of from about 25 to about 800. It is most preferred to use polyhydric polyalkylene ethers which have an hydroxyl number between about 50 and about 350.

Examples of polyhydric polyakylene ethers which may be used are, for example, the condensation product of an alkylene oxide or of an alkylene oxide with a polyhydric alcohol. Any suitable polyhydric alcohol may be used such as those disclosed above for use in the preparation of the hydroxyl polyesters. Any suitable alkylene oxide may be used such as, for example, ethylene oxide, propylene oxide, butylene oxide, amylene oxide and the like. Of course, the polyhydric polyalkylene ethers can be prepared from other starting materials such as, for example, tetrahydrofuran, epihalohydrins such as, for example, epichlorohydrin and the like as well as aralkylene oxides such as, for example, styrene oxide and the like. The polyhydric polyalkylene ethers may have either primary or secondary hydroxyl groups and preferably are polyhydric polyalkylene ethers prepared from alkylene oxides having from two to five carbon atoms such as, for example, polyethylene ether glycols, polypropylene ether glycols, polybutylene ether glycols and the like. It is often advantageous to employ some trihydric or higher polyhydric alcohol such as glycerine, trimethylol propane, pentaerythritol and the like in the preparation of the polyhydric polyalkylene ethers so that some branching exists in the product. Generally speaking, it is advantageous to condense from about 5 to about 30 mols of alkylene oxide per functional group of the trihydric or higher polyhydric alcohol. The polyhydric polyalkylene ethers may be prepared by any known process such as, for example, the process disclosed by Wurtz in 1859 and in Encyclopedia of Chemical Technology, vol. 7, pp. 257–262, published by Interscience Publishers Inc. (1951) or in U.S. Patent 1,922,459.

Other suitable polyhydric polyakylene ethers are the addition products of the afore-mentioned alkylene oxides with amines including aliphatic, aromatic and heterocyclic monoamines or polyamines which contain a plurality of active hydrogen atoms. The condensation of the amine and the alkylene oxide may be produced by any known method. The manipulative steps disclosed in U.S. Patent 2,174,762 or the process disclosed in U.S. Patent 2,257,817 may be used. Any suitable amine may be used such as, for example, 2,4-toluylene diamine, 2,6-toluylene diamine, 4,4'-diamino diphenyl methane, phenylene diamine, 1,5 - naphthalene diamine, 4,4' - diamino 3,3' - dichloro diphenyl methane, 4,4'-diamino diphenyl dimethyl methane, 2,4,4'-triamino 3,3'-methyl diphenyl methane, xylylene diamine, ethylene diamine, propylene diamine, 1,4-butylene diamine, 1,6-hexane diamine, furfurylidene diamine and the like. Addition products of the alkylene oxides with amino alcohols having one free primary amino group and one free hydroxyl group or one secondary amino group and one free hydroxyl group such as, for example, ethanol amine, N-alkyl ethanol amines such as N-methyl ethanol amine, N-ethyl ethanol amine, diethanol amine, N-alkyl diethanol amines such as N-methyl diethanol amine and the like may also be used. Still other polyhydric polyalkylene ethers which may be used are those containing a plurality of hydrogen atoms which are capable of adding alkylene oxide such as, for example, cane sugar, castor oil and the like.

The polyhydric polyalkylene ethers can be used in admixture with other polyvalent compounds containing active hydrogen containing groups such as, for example, ethylene glycol, 1,4-butylene glycol, glycerine, trimethylol propane, pentaerythritol, tartaric acid esters, castor oil and the like.

The process of preparing the cellular polyurethane plastics in accordance with the invention may be carried out by the conventional and well known operations which have become common in the art. A suitable process for carrying out this invention is, for example, disclosed in U.S. Reissue Patent 24,514 which discloses, in addition, a suitable apparatus for carrying out the process of the invention on a large scale. The accelerators, dyestuffs, temperatures, proportions and the like disclosed in the above-identified patent may also be used in the process of this invention. However, the invention need not be carried out using the apparatus, but may be carried out by simply combining the polyisocyanate with the polyether and a blowing agent in the presence of the silicone compounds which act as stabilizers and preferably in the presence of an accelerator to produce a cellular polyurethane plastic.

It is necessary to have a blowing agent in the reaction mixture leading to the production of a cellular polyurethane plastic. The blowing agent may be water which will react with an organic polyisocyanate to produce carbon dioxide. Alternatively, a low boiling blowing agent may be used such as, for example, halohydrocarbons such as dichlorodifluoromethane, trichlorofluoromethane and the like.

The preferred accelerators are the tertiary amines such as, for example, dimethyl benzyl amine, N-alkyl morpholines such as, for example, N-ethyl morpholine, N,N'-dialkyl piperazine such as, for example, N,N'-dimethyl piperazine, N-methyl N-ethyl piperazine, N,N'-endoethylene piperazine, 1-alkoxy-3-dimethyl amino propanes such as, for example, 1-methoxy-3-dimethyl amino propane, N-coco morpholine, triethylene diamine, diethyl ethanol amine. Another preferred type of catalyst is the tin compounds such as, for example, inorganic salts, such as, stannous chloride, tin salts of carboxylic acids such as, dibutyl tin di-2-ethyl hexoate, dibutyl tin dilaurate and the like, tin alcoholates such as stannous octoate, stannous oleate and the like. Other suitable organometallic compounds are disclosed in U.S. Patent 2,846,468 as well as in German Patents 958,774 and 1,028,773. Additional catalysts are, for example, alkalies such as alkali phenolate, alkali alcoholates and alkaline earth oxides such as, for example, sodium phenoxide, sodium methoxide, potassium phenoxide, calcium oxide, strontium oxide and the like. It is often advantageous to employ other additives in addition to the catalyst and the stabilizer in the production of the cellular polyurethane plastics of the invention, such as, for example, additional additives for regulation of pore size and cell structure as well as fillers, dyestuffs and plasticizers. Also, emulsifiers may be used such as sulphonated castor oil and the like.

The cellular polyurethane plastics of the invention are useful for many applications, for example, in the production of building materials including both sound and thermal insulation for interlining i.e. the material between the ordinary lining and the outer fabric of a garment, for the production of cushions, pillows, crash pads for automobiles, arm rests for automobiles and the like.

The invention is further illustrated by the following examples in which the parts are by weight unless otherwise indicated.

EXAMPLE 1

About 100 parts of a slightly branched polypropylene ether glycol (prepared from 1 mol of 1,3-propylene glycol, 1 mol of trimethylol propane and 48 mol of propylene oxide, molecular weight about 3000; hydroxyl number about 56) are mixed with about 35 parts of a mixture of 80% 2,4- and 20% 2,6-toluylene diisocyanate, about 0.05 part of dibutyl-tin-dilaurate and about 0.5 part of a compound having the formula:

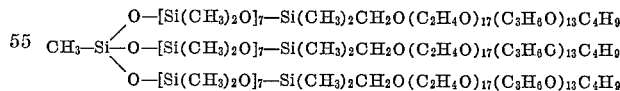

about 0.3 part of endoethylene piperazine and about 2,6 parts of water. The foam material which forms from the liquid reaction mixture has very good physical properties; with a bulk density of about 44 kg./m.³, there is obtained a tensile strength of about 1.3 kg./cm.², a breaking elongation of about 200%, an impact hardness (at 40% compression) of about 51 g./cm.² and a rebound elasticity of about 55%. The residual pressure deformation after about 22 hours at about 70° C. is about 13%.

A comparison experiment conducted without addition of the silicon compound does not produce a stable foam material and it immediately collapses.

EXAMPLE 2

About 100 parts of the polypropylene ether glycol referred to in Example 1 are intimately mixed with about 35 parts of the toluylene diisocyanate of Example 1 and about 0.05 part of dibutyl-tin-dilaurate. After admixing about 0.5 part of a compound of the formula

[HO—(CH$_2$)$_2$NH(CH$_2$)$_2$NHCH$_2$Si(CH$_3$)$_2$]$_2$O about 0.3 part of endoethylene piperazine and about 2.6 parts of water, the mass becomes turbid after a short time and a polyurethane foam material is formed which has good physical properties.

EXAMPLE 3

About 100 parts of the polypropylene ether glycol referred to in Example 1 are intimately mixed with about 35 parts of the toluylene diisocyanate of Example 1 and about 0.05 part of dibutyl-tin-dilaurate and about 0.1 part of a compound having the formula

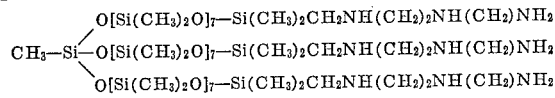

are added. After mixing in a solution of about 0.3 part of endoethylene piperazine in about 2.6 parts of water, the solution becomes cloudy after a short time and a polyurethane foam material having good physical properties is formed.

EXAMPLE 4

About 100 parts of the polypropylene ether glycol referred to in Example 1 are intimately mixed with about 35 parts of the toluylene diisocyanate of Example 1 and about 0.1 part of dibutyl-tin-dilaurate and about 3.0 parts of a compound of the formula

[(HOCH$_2$CH$_2$)$_2$NCH$_2$Si(CH$_3$)$_2$]$_2$O are added. After mixing in a solution of about 0.2 part of endoethylene piperazine in about 2.6 parts of water, the solution becomes cloudy after a short time and a foam material having good physical properties is formed.

EXAMPLE 5

The procedure is as in Example 1, but the silicon compounds 5 to 7 are used.

EXAMPLE 6

The procedure is as in Example 1. Instead of 0.05 part dibutyl-tin-dilaurate are used 0.4 part of stannous octoate or stannous-2-ethyl hexoate. Furthermore the silicon compounds 10 to 12 are employed instead of the silicon compound 1, but in the very same amount.

EXAMPLE 7

About 100 parts of the polypropylene ether glycol referred to in Example 1 are intimately mixed with about 35 parts of the toluylene diisocyanate of Example 1 and about 0.2 part of dibutyl-tin-dilaurate. After admixing about 1.0 part of the silicon compound 8 or 9, about 0.5 part of endoethylene piperazine and about 2.6 parts of water, the mass becomes turbid after a short time and a polyurethane foam material is formed which has good physical properties.

EXAMPLE 8

A mixture A of water, a tertiary amine catalyst and a silicon stabilizer is made.

2.6 parts of water
0.3 part of endoethylenepiperazine and
0.5 part of a compound having the formula

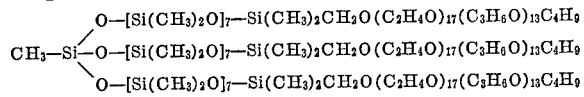

Mixture B of water, tertiary amine catalyst and silicon stabilizer of prior art is made for comparison purposes.

2.6 parts of water
0.3 part of endoethylenepiperazine and
0.5 part of a compound having the formula

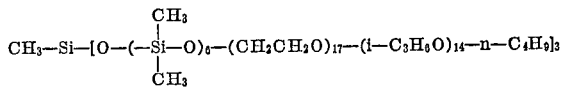

Mixture A and B each are used to prepare a polyurethane foam by admixing a respective mixture to 100 parts of a slightly branched polypropyleneglycol (prepared from 1 mol of 1,3-propyleneglycol, 1 mol of trimethylolpropane and 48 mols of propyleneoxide, molecular weight about 3000; hydroxyl number about 56),
35 parts of a mixture of 80% 2,4- and 20% 2,6-toluylene diisocyanate,
0.05 part of dibutyl-tin-dilaurate.

The liquid reaction mixtures are poured into a mold with the dimensions 13 times 19 cm.

Both the foams show the physical properties of Example 1. The height of molding is 12 cm. in each case.

The mixtures A and B are left standing for 3, 6, 9, 12, 15 and 18 days. After the storage of the mixtures indicated in days the foaming procedure is repeated with both the mixtures and with the same foaming recipe as above. The following table indicates the height by maximum expansion of the foam and shows the practically unchanged stabilising effect of mixture A even after 18 days storage, while the foam products obtained with mixture B shows a steadily decreasing height of maximum expansion due to the increased hydrolytic degradation of the silicon stabilizer contained in the mixture B.

| Storage time in days | Height of maximum expansion (cm.) | Amount of settling | |
|---|---|---|---|
| | | Cm. | Percent |
| Mixture A: | | | |
| 0 | 12 | | |
| 3 | 12 | | |
| 6 | 11.8 | | |
| 9 | 12 | | |
| 12 | 12 | | |
| 15 | 11.5 | | |
| 18 | 12 | | |
| Mixture B: | | | |
| 0 | 12 | | |
| 3 | 10.5 | 1.5 | 12 |
| 6 | 10 | 2 | 16.5 |
| 9 | 10 | 2 | 16.5 |
| 12 | 9 | 3 | 25 |
| 15 | 9 | 3 | 25 |
| 18 | 8 | 4 | 33.3 |

It is to be understood that any other suitable organic polyisocyanate, polyhydric polyalkylene ether, blowing agent, silicone stabilizer or other additive could have been used in the foregoing examples in place of the specific examples provided that the teachings of this disclosure are followed. In other words, the foregoing examples are given for the purpose of illustration.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:
1. A storage stable composition of matter which is stable against hydrolysis and useful in the manufacture of a cellular polyurethane plastic by a process which comprises reacting an organic polyisocyanate with a polyhydric polyalkylene ether in the presence of a blowing agent, which consists essentially of a solution of water and a tertiary amine catalyst for polyurethane forming reactions and an amount effective to stabilize against hydrolysis of a stabilising compound having the formula

$A_wB_xC_yD_z$ wherein $A = CH_3SiO_{3/2}$, $B = (CH_3)_2SiO_{2/2}$, $C = (CH_3)_3SiO_{1/2}$ $D = (CH_3)(R)(O_{1/2})Si—CH_2—Y—R''—Z$; wherein $w = 0-10$ $x = 1-150$, $y = 0-10$, $z = 1-5$; wherein Z is selected from the group consisting of $NH_2$, $NHR'$, $NR'_2$, $$NH-[R''NH]_p-H$$

$NH-[R''O]_qH$, $NR'-[R''NH]_p-H$, $NR'-[R''O]_qH$, $OH$, $OR'$, $O-[R''O]_p-H$ and $O-[R_2'O]_qR'$; $R''$ is an alkylene radical having from two to six carbon atoms, Y is selected from the group consisting of $-NH'-$, $NR'-$,

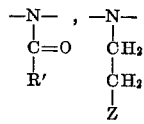

and O, R is selected from the group consisting of $CH_3$ and $O_{1/2}$, $R'$ is selected from the group consisting of alkyl and aryl and $n$, $m$, $o$, $p$ and $q$ are integers.

2. The composition of matter of claim 1, wherein the stabilising compound (c) has the formula $$Z-R''-Y-CH_2-\underset{\underset{CH_3}{|}}{\overset{\overset{CH_3}{|}}{Si}}-O-\underset{\underset{CH_3}{|}}{\overset{\overset{CH_3}{|}}{Si}}-CH_2-Y-R''-Z$$

the symbols having the same meaning indicated in claim 1.

3. The composition of matter of claim 1, wherein the stabilising compound (c) has the formula

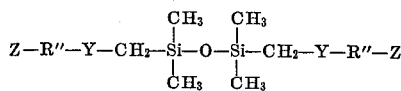

the symbols having the meaning indicated in claim 1.

4. The composition of matter of claim 1, wherein the stabilising compound (c) has the formula $$[HO-(CH_2)_2NH(CH_2)_2NHCH_2Si(CH_3)_2]_2O$$

5. The composition of matter of claim 1, wherein the stabilising compound (c) has the formula $$[(HOCH_2CH_2)_2NCH_2Si(CH_3)_2]_2O$$

6. The composition of matter of claim 1, wherein the stabilising compound (c) has the formula

7. The composition of matter of claim 1, wherein the stabilising compound (c) has the formula $$[Si(CH_3)_2O]_{20}[CH_3SiO_{3/2}]$$
$$[O_{1/2}Si(CH_3)_2CH_2NH(CH_2)_2NH(CH_2)_2NH_2]_3$$

References Cited

UNITED STATES PATENTS

| | | | |
|---|---|---|---|
| 2,846,458 | 8/1958 | Haluska | 260—448.2 |
| 3,070,556 | 12/1962 | Merten et al. | 260—2.5 |

FOREIGN PATENTS

| | | |
|---|---|---|
| 1,212,252 | 10/1959 | France. |
| 1,230,820 | 4/1960 | France. |

LEON D. ROSDOL, *Primary Examiner.*

I. GLUCK, *Assistant Examiner.*

U.S. Cl. X.R.

260—2.5, 45.9, 46.5, 448.2